United States Patent [19]

Prouza et al.

[11] Patent Number: 4,703,902

[45] Date of Patent: Nov. 3, 1987

[54] DRAG MECHANISM FOR FLY FISHING REEL

[75] Inventors: Harry A. Prouza, Afton, Minn.; Herman G. Voss, Pompano Beach, Fla.

[73] Assignee: Minnesota Mining and Manufacturing Company, St. Paul, Minn.

[21] Appl. No.: 857,726

[22] Filed: Apr. 29, 1986

[51] Int. Cl.$^4$ .............................................. A01K 89/02
[52] U.S. Cl. .............................. 242/84.51 R; 188/71.5; 188/72.7
[58] Field of Search ................... 242/84.5 R, 84.5 A, 242/84.5 P, 84.51 R, 84.51 A; 188/171.5, 72.7

[56] References Cited

U.S. PATENT DOCUMENTS

| | | | |
|---|---|---|---|
| 1,005,154 | 10/1911 | Catucci | 242/84.5 R |
| 2,306,259 | 12/1942 | Khoenle | 242/84.5 R |
| 3,254,861 | 6/1966 | Jahn | 242/84.21 |
| 3,434,676 | 3/1969 | Bogue | 242/84.5 R |
| 3,481,554 | 12/1969 | Hull | 242/84.51 R |
| 3,510,083 | 5/1970 | Cook | 242/84.51 R |
| 3,549,103 | 12/1970 | Sarah | 242/84.5 R |
| 3,652,031 | 3/1972 | Kosek | 242/219 |
| 3,675,870 | 7/1972 | Ride et al. | 242/84.1 |
| 3,804,349 | 4/1974 | Serini et al. | 242/84.5 A |
| 3,989,204 | 11/1976 | Lemery | 242/84.5 R |
| 4,352,474 | 10/1982 | Kovalovsky | 242/218 |
| 4,402,469 | 9/1983 | Stiner | 242/84.5 P |

Primary Examiner—Billy S. Taylor
Attorney, Agent, or Firm—Donald M. Sell; James A. Smith; David W. Anderson

[57] ABSTRACT

A fly fishing reel includes a drag mechanism having a rotor attached to the line-storage spool. The rotor is frictionally engaged by two elastomeric annular rings which are variably compressed by two shell halves which are in turn compressed by a drag-adjustment knob threaded to a shaft which supports and journals the spool.

8 Claims, 4 Drawing Figures

DRAG MECHANISM FOR FLY FISHING REEL

BACKGROUND OF THE INVENTION

1. Field of the Invention

The present invention relates to fishing reels and, more particularly, fly fishing reels which include means for providing an adjustable drag.

2. Description of the Prior Art

Fly fishing is usually accomplished by casting fishing line which has been previously extracted from the fly fishing reel and allowed to accumulate at the feet of the fisherman in a boat or on shore. The fishing reel is thus, in this type of fishing, only a reservoir on which can be wound a quantity of fishing line and backing.

A fly fishing reel, however, does play an important part in fly fishing after the cast has been made. Such reels are usually provided with an adjustable drag mechanism which provides resistance to the unwinding of further line after the cast has been made and a fish hooked. This resistance tires the fish and eventually allows the fisherman to retrieve the line and thus land the fish.

The resistance to unwinding provided by the fishing reel must be adjustable to cope with the power of the particular fish hooked, and the resistance provided by the drag mechanism must be as constant and as consistent as possible so that the fishing line or its leader is not jerked and broken.

Drag mechanisms shown in the prior art, and in particular U.S. Pat. Nos. 3,989,204 and 4,352,474, usually include planar friction plates which are forced into frictional engagement by compression of a spring bearing upon one of the plates. Drag mechanisms of this type have been effective in producing a resistance to unwinding of the reel but have not achieved a desirable constancy in the resistance produced.

SUMMARY OF THE INVENTION

The present invention obviates the problems of drag inconsistency by providing a drag mechanism which employs annular rings as the friction producing members rather than planar plates of friction material. The use of annular rings produces a drag mechanism which provides a resistance to unwinding which is more constant and consistent than has been observed with drag mechanisms of the prior art.

In particular, the annular rings of the present invention are incorporated in a fly fishing reel for use with a fishing rod, which reel includes a frame adapted for attachment to the rod, a stub shaft extending from the frame, a spool for receiving convolutely-wound fishing line and journaled on the shaft, a drag mechanism disposed between the frame and the spool and including a first shell half having a bearing plate and an upstanding annular wall extending from the plate and concentrically surrounding the shaft, a second shell half including a bearing plate and an upstanding annular wall extending from the plate and concentrically surrounding the shaft, wherein the first and second shell halves are oriented such that the upstanding walls extend from their respective bearing plates toward each other, a first elastomeric annular ring having an outer diameter substantially equal to the inner diameter of the annular wall of the first shell half and located within the first shell half adjacent the bearing plate and the annular wall, a second elastomeric annular ring having an outer diameter substantially equal to the inner diameter of the annular wall of the second shell half and located within the second shell half adjacent the bearing plate and the annular wall, a rotor disposed between the first and the second shell halves and in frictional engagement with each of the first and second annular rings, and means for connecting the rotor and the spool in at least one rotational sense of the spool so that the spool drives the rotor when rotated in at least this one rotational sense. The fly fishing reel of the present invention further includes means for preventing rotation of the first and the second shell halves relative to each other and relative to the frame and means for adjusting the separation of the first and the second shell halves and thereby adjusting the compression of the first and the second annular rings and the frictional engagement between the first and the second annular rings and the rotor.

It is also desirable in the preferred embodiment that the first and second annular rings be circular in cross-section when not compressed, that the rotor include frusto-conical surfaces in contact with each of the annular rings to force the annular rings into contact with the bearing plates and annular walls of the shell halves and, finally, that the first and second annular rings be of like dimensions and the annular walls of the first and second shell halves have like inner diameters.

BRIEF DESCRIPTION OF THE DRAWINGS

The present invention will be more thoroughly described with respect to the accompanying drawings wherein like numbers refer to like parts in the several views, and wherein.

DESCRIPTION OF THE PREFERRED EMBODIMENT

Figure 1:
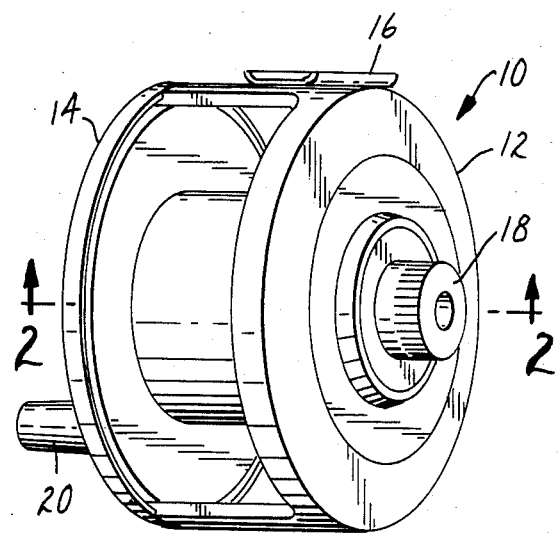
FIG. 1 is a perspective view of a fly fishing reel of the present invention.

FIG. 1 illustrates a fly fishing reel, generally indicated as 10, according to the present invention which includes a frame 12 and a spool 14 upon which may be convolutely wound a fishing line (not shown). The frame 12 includes a mounting plate 16 by which the reel 10 may be mounted to a fishing rod (not shown) and an adjustment knob 18 which may be turned to adjust the resistance of a drag mechanism to be explained below. The spool 14 includes a handle 20 which permits the fisherman to turn the spool 14 relative to the frame 12 and thereby wind or unwind the fishing line.

Figure 3:
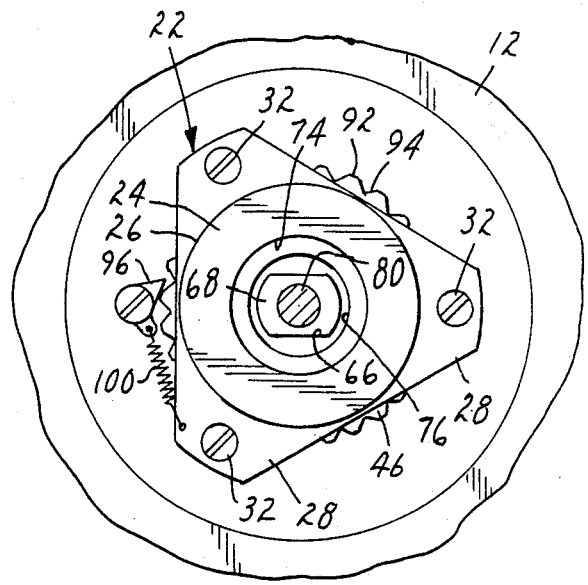
FIG. 3 is a partial, cross-sectional view of the fishing reel of the present invention, taken generally along the line 3—3 of FIG. 2.
Figure 2:
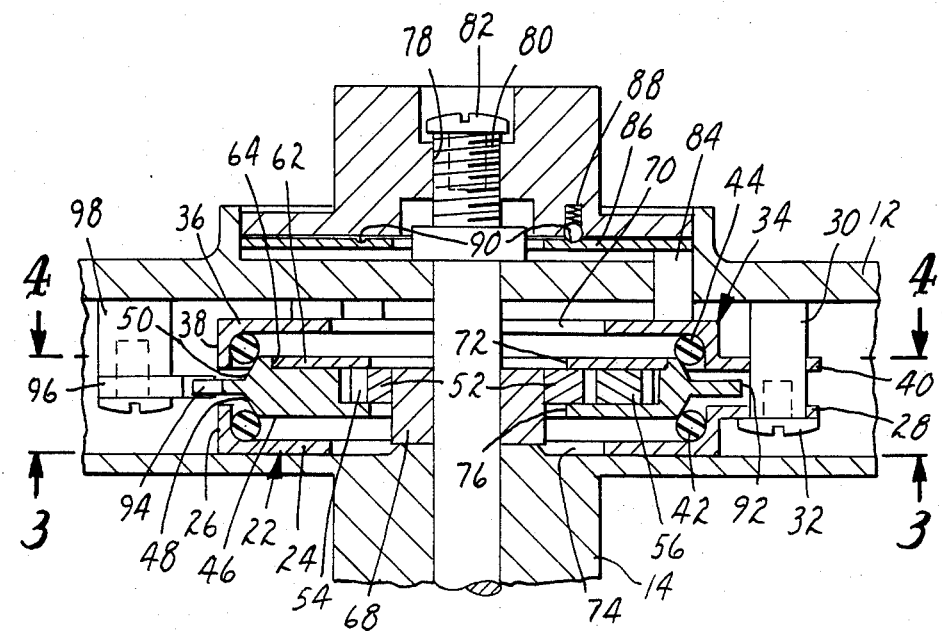
FIG. 2 is a partial, cross-sectional view taken generally along the line 2—2 of FIG. 1.

FIG. 2 is a cross-sectional view of the fishing reel 10 and primarily illustrates the drag mechanism employed therein. The drag mechanism includes a first shell half 22 which may also be seen in FIG. 3. The shell half 22 includes a bearing plate 24 from which projects an annular upstanding wall 26. From the annular wall 26 extends a flange 28 which is secured at three points to the frame 12, as is best seen in FIG. 3. The flange 28 is secured to the frame 12 at three posts 30 which prevent the first shell half 22 from rotating relative to the frame 12. As will be seen in FIG. 2, the flange 28, and therefore the first shell half 22, is permitted to move axially with respect to the post 30, the only constraint being a screw 32 which is threaded to the post 30 and which limits movement of the first shell half 22 away from the frame 12 and toward the spool 14.

The drag mechanism further includes a second shell half 34 which is identical in construction to the first shell half 22 and likewise includes a bearing plate 36, an annular upstanding wall 38 and a flange 40. The flange 40 of the second shell half 34 is attached to the posts 30 as is the flange 28 of the first shell half 22, and is likewise prevented from rotating relative to the frame 12. Although the first 22 and second 34 shell halves are identical in construction, they are assembled in opposite orientation so that the annular walls 26 and 38 extend toward each other from their respectively bearing plates 24 and 36. Located within the first 22 and second 34 shell halves are elastomeric annular rings (O-rings) 42 and 44 which are identical in material and dimensions and which are sized such that the outer diameters of the rings 42 and 44 are substantially equal to the inner diameters of the annular walls 26 and 38. The annular rings 42 and 44 preferably have a circular cross-section, although such a cross-sectional shape is not necessary, and may be manufactured of any resilient elastomeric material which resists abrasion and which resists taking a permanent set when deformed. The preferred material for the annular rings 42 and 44 is a fluoroelastomer, particularly fluorocarbon.

Disposed between the first and second shell halves 22 and 34 is a rotor 46 which includes opposed frusto-conical walls 48 and 50 which respectively frictionally engage the annular rings 42 and 44. The surfaces 48 and 50 are preferably frusto-conical to force the rings 42 and 44 into engagement with both the bearing plates 24 and 36 and the annular walls 26 and 38. The preferred inclination of the conical surfaces 48 and 50 is approximately 60 degrees from the plane of the rotor 46, although greater or lesser inclinations of the surfaces 48 and 50 will also serve to engage the rings 42 and 44 and constrain the rings 42 and 44 to remain within the shell halves 22 and 34.

To reduce abrasion of the rings 42 and 44 by contact with the rotor 46, the rings 42 and 44 are librally coated with a light grease. The provision of this grease is also believed to contribute to the exceptional consistency of frictional resistance exhibited by the drag mechanism as the rotor 46 rotates in engagement with the rings 42 and 44. Any light grease which is compatible with the material comprising the rings 42 and 44 and which has a viscosity sufficient to remain within the shell halves 22 and 34 may be used, with the preferred grease being Lubriplate 105, a calcium based lubricant, manufactured by Fiske Brothers Refining Co., and having a viscosity of 300 SUS at 38 degrees C.

Figure 4:
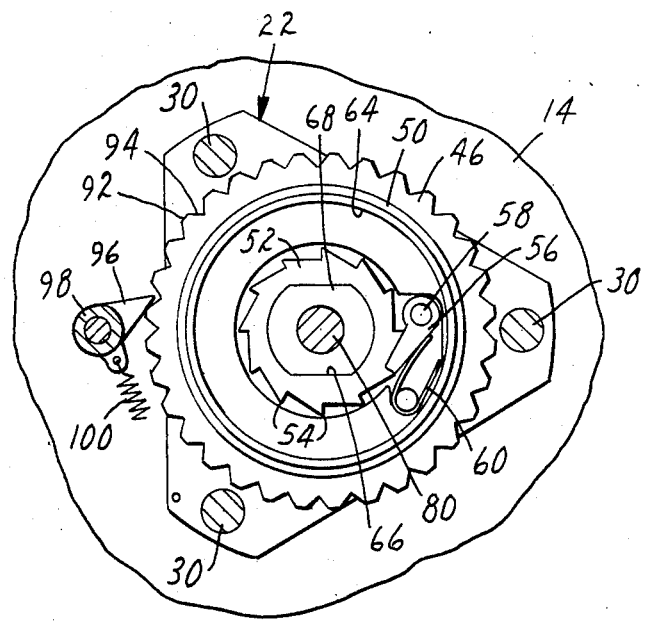
FIG. 4 is a partial, cross-sectional view of the fishing reel of the present invention, taken generally along the line 4—4 of FIG. 2.

The rotor 46 is connected to the spool 14 by means of an internal ratchet wheel 52 which may be best seen in FIGS. 2 and 4. The ratchet wheel 52 includes a number of teeth 54 on its outer surface which engage a pawl 56 also located within the rotor 46. The pawl 56 is mounted on a post 58 and biased toward the ratchet wheel 52 by a spring 60. The ratchet wheel 52 and pawl 56 are protected and contained within the rotor 46 by a cover 62 which fits within a recess 64 in the upper surface of the rotor 46.

The ratchet wheel 52 includes a central, keyed bore 66 which accepts a similarly keyed stub shaft 68 extending from the spool 14 and through the lower surface of the rotor 46. By means of the ratchet wheel 52 and the pawl 56 it will be recognized that the spool 14 will cause the rotor 46 to rotate when the spool 14 is rotated in one directional sense, but that the ratchet wheel 52 will not be engaged by the pawl 56, and therefore the rotor 46 will not rotate, when the spool 14 is rotated in the opposite sense. This action of the ratchet wheel 52 will cause the spool 14 to encounter a resistance to rotation when the spool is turned in one direction but will allow the spool 14 to free-wheel when turned in the opposite direction. It is necessary that the resistance to rotation of the spool 14 be present when fishing line is being removed from the spool 14, as by a hooked fish, and that the spool 14 free-wheel when turned by the fisherman to rewind fishing line therein. The direction of desired resistance, therefore, will change as the left or right-handedness of the fisherman changes. To accommodate this situation, the drag mechanism, which includes the shell halves 22 and 34 and the rotor 46, is symmetrically constructed so that the handedness of the drag mechanism may be reversed by reversing the entire drag mechanism structure. To this end, the upper shell half 34, as positioned in FIG. 2, and the upper surface of the rotor 46 are provided with holes 70 and 72 which correspond to holes 74 and 76 located in the remaining shell half 22 and the lower surface of the rotor 46, respectively. Thus the direction of free-wheel of the spool 14 may be reversed simply by removing the screws 32, reversing the entire drag mechanism including the first and second shell halves 22 and 34 and the rotor 46 and replacing the screws 32. Alternatively, the direction of free-wheel may be reversed by removing the first shell half 22 and its associated ring 42, reversing the rotor 46 only and replacing the first shell half 22.

The resistive drag applied to the spool 14 may be adjusted by means of the adjustment knob 18. The adjustment knob 18 includes an internally threaded bore 78 threaded to a shaft 80 which extends in one direction from the frame 12 to engage the adjustment knob 18 and in the opposite direction from the frame 12 to mount and journal the fishing line spool 14. The adjustment knob 18 is prevented from being turned off the shaft 80 by a screw 82 threaded to the end of the shaft 80 and a similar arrangement (not shown) prevents the spool 14 from sliding off the opposite end of the shaft 80.

Rotation of the adjustment knob 18 in the direction which will cause downward movement from the perspective of FIG. 2 will cause the adjustment knob 18 to force three pins 84 into contact with the upper shell half 34 through a plate 86 mounting the pins 84. Increased downward movement of the adjustment knob 18 will force the upper shell half 34 toward the lower shell half 22 and thus increase the compression of the annular rings 42 and 44 and, therefore, the frictional drag generated by contact between the rotor surfaces 48 and 50 and the rings 42 and 44. Opposite rotation of the adjustment knob 18 will, of course, allow the shell halves 22 and 34 to separate and thus reduce the frictional engagement between the rotor 46 and the annular rings 42 and 44. The rotational position of the adjustment knob 18 is maintained by a number of spring-loaded ball detents 88 located in the adjustment knob 18 which engage depressions 90 formed in the pin-connecting plate 86.

As also is shown in FIGS. 2 and 4, the radial outer edge 92 of the rotor 46 is formed with teeth 94 which engage a pawl 96 mounted on a post 98 connected to the housing 12 and biased toward the rotor 46 by a spring 100. These rotor teeth 94 and the pawl 96 provide no function related to the resistance to rotation of the drag mechanism and are present only to produce noise as the rotor 46 rotates. This "noise maker" is provided merely to indicate to the fisherman that fishing line is being unwound from the spool 14 and that, it is hoped, a fish has been hooked.

There has thus been described a fly fishing reel which is easily manufactured, easily reversed and which has been observed to produce a more consistent and constant drag than fly fishing reels of the prior art. Although the fishing reel of the present invention has been described with respect to only a single embodiment, it is recognized that many modifications will be apparent to those skilled in the art. For example, the functions of the rotor 46 and the shell halves 22 and 34 could be reversed simply by keying the rotor 46 to the shaft 80 and connecting the spool 14 to the shell halves 22 and 34. This arrangement, however, would either require that the drag mechanism be replaced as spools 14 are changed or that disassembly be unduly complicated. The present arrangement has been adopted to facilitate changing of the spools 14 and should not limit the scope of the appended claims.

We claim:

1. A drag mechanism comprising:
   a first shell half including a bearing plate and an upstanding annular wall extending from said plate;
   a second shell half including a bearing plate and an upstanding annular wall extending from said plate;
   said first and said second shell halves being oriented such that said upstanding walls extend from their respective bearing plates toward each other;
   a first elastomeric annular ring having an outer diameter substantially equal to the inner diameter of said annular wall of said first shell half and located within said first shell half adjacent said bearing plate and said annular wall;
   a second elastomeric annular ring having an outer diameter substantially equal to the inner diameter of said annular wall of said second shell half and located within said second shell half adjacent said bearing plate and said annular wall;
   a rotor disposed between said first and said second shell halves and including frusto-conical surfaces in frictional engagement with each of said first and said second annular rings and oriented to force said first and said second annular rings into contact with said bearing plates and said annular walls of said first and said second shell halves;
   means for preventing rotation of said first and said second shell halves relative to each other; and
   means for adjusting the separation of said first and said second shell halves and thereby adjusting the compression of said first and said second annular rings and the frictional engagement between said first and said second annular rings and said rotor.

2. A drag mechanism according to claim 1 wherein said first and said second annular rings are circular in cross-section when not compressed.

3. A drag mechanism according to claim 1 wherein said first and said second annular rings are of like dimensions and wherein said annular walls of said first and said second shell halves have like inner diameters.

4. A fly fishing reel for use with a fishing rod, comprising:
   a frame adapted for attachment to said rod;
   a stub shaft extending from said frame;
   a spool for receiving convolutely-wound fishing line and journalled on said shaft;
   a drag mechanism disposed between said frame and said spool and including:
      a first shell half including a bearing plate and an upstanding annular wall extending from said plate and concentrically surrounding said shaft;
      a second shell half including a bearing plate and an upstanding annular wall extending from said plate and concentrically surrounding said shaft;
      said first and said second shell halves being oriented such that said upstanding walls extend from their respective bearing plates toward each other;
      a first elastomeric annular ring having an outer diameter substantially equal to the inner diameter of said annular wall of said first shell half and located within said first shell half adjacent said bearing plate and said annular wall;
      a second elastomeric annular ring having an outer diameter substantially equal to the inner diameter of said annular wall of said second shell half and located within said second shell half adjacent said bearing plate and said annular wall;
      a rotor disposed between said first and said second shell halves and including frusto-conical surfaces in frictional engagement with each of said first and said second annular rings and oriented to force said first and said second annular rings into contact with said bearing plates and said annular walls of said first and said second shell halves;
   means for connecting said rotor and said spool in at least one rotational sense of said spool so that said spool drives said rotor when rotated in said at least one rotational sense;
   means for preventing rotation of said first and said second shell halves relative to each other and relative to said frame; and
   means for adjusting the separation of said first and said second shell halves and thereby adjusting the compression of said first and said second annular rings and the frictional engagement between said first and said second annular rings and said rotor.

5. A fly fishing reel according to claim 4 wherein said first and said second annular rings are circular in cross-section when not compressed.

6. A fly fishing reel according to claim 4 wherein said first and said second annular rings are of like dimensions and wherein said annular walls of said first and said second shell halves have like inner diameters.

7. A fly fishing reel according to claim 4 wherein said means for adjusting the separation of said first and said second shell halves includes means for axially fixing one of said shell halves with respect to said shaft and a knob threaded on said shaft and bearing upon said bearing plate of the other of said shell halves.

8. A fly fishing reel according to claim 4 wherein said means for connecting said rotor and said spool comprises a toothed ratchet plate connected to said spool and a pawl engaging said ratchet plate and connected to said rotor.

* * * * *